(12) United States Patent
Townsend

(10) Patent No.: US 7,401,544 B2
(45) Date of Patent: Jul. 22, 2008

(54) PLUNGER WITH ANNULAR EXTERIOR SEALS AND METHOD OF INSTALLING ANNULAR SEALS ON AN EXTERIOR SURFACE OF A PLUNGER

(75) Inventor: Murray R. Townsend, Lindale (CA)

(73) Assignee: Fourth Dimension Designs Ltd., Edmonton, Alberta (CA)

( * ) Notice: Subject to any disclaimer, the term of this patent is extended or adjusted under 35 U.S.C. 154(b) by 173 days.

(21) Appl. No.: 11/349,443

(22) Filed: Feb. 7, 2006

(65) Prior Publication Data

US 2007/0022874 A1   Feb. 1, 2007

(30) Foreign Application Priority Data

Jul. 26, 2005   (CA) .................................. 2,515,134

(51) Int. Cl.
    *F01B 29/00* (2006.01)
(52) U.S. Cl. ........................... 92/128; 92/169.1; 29/451; 29/700
(58) Field of Classification Search .................... 92/128, 92/169.1; 29/451, 700
    See application file for complete search history.

(56) References Cited

U.S. PATENT DOCUMENTS

| 6,148,923 A * | 11/2000 | Casey ........................ 166/372 |
| 2005/0025644 A1* | 2/2005 | Ford ............................ 417/430 |
| 2007/0067978 A1* | 3/2007 | Relan .......................... 29/451 |

OTHER PUBLICATIONS

Internet pages, "System Seals", Piston Seal Install Cone, and Simple Piston Seal Install Animation, Apr. 10, 2005.*

* cited by examiner

*Primary Examiner*—Igor Kershteyn
(74) *Attorney, Agent, or Firm*—Davis Bujold & Daniels, P.L.L.C.

(57) ABSTRACT

A method of installing annular seals on a plunger. A first step involves positioning an annular seal on a seal installation tool adapted to hold the annular seal in an expanded state. A second step involves positioning the annular seal so that the annular seal overlies a body of a plunger. A third step involves transferring the annular seal from the seal installation tool to a seal groove in the body of the plunger.

6 Claims, 3 Drawing Sheets

PLUNGER WITH ANNULAR EXTERIOR SEALS AND METHOD OF INSTALLING ANNULAR SEALS ON AN EXTERIOR SURFACE OF A PLUNGER

This application claims priority from Canadian Application Serial No. 2,515,134 filed Jul. 26, 2005.

FIELD OF THE INVENTION

The present invention relates to a plunger with annular exterior seals and a method of installing annular seals on an exterior surface of a plunger.

BACKGROUND OF THE INVENTION

Gas lift plungers have a number of annular exterior seals. A joint is positioned at each seal location to allow the disassembly of the plunger, in order to facilitate installation of the annular seals. Each joint is a potential failure point for the plunger.

SUMMARY OF THE INVENTION

According to one aspect of the present invention there is provided a plunger, which has a cylindrical body. All or at least a portion of the body is in one piece with more than one circumferential exterior seal groove. Replaceable annular seals are positioned in selected ones of the seal grooves.

According to another aspect of the present invention there is provided a method of installing annular seals on a plunger. A first step involves positioning an annular seal on a seal installation tool adapted to hold the annular seal in an expanded state. A second step involves positioning the annular seal so that the annular seal overlies a body of a plunger. A third step involves transferring the annular seal from the seal installation tool to a seal groove in the body of the plunger.

BRIEF DESCRIPTION OF THE DRAWINGS

These and other features of the invention will become more apparent from the following description in which reference is made to the appended drawings, the drawings are for the purpose of illustration only and are not intended to in any way limit the scope of the invention to the particular embodiment or embodiments shown, wherein.

DETAILED DESCRIPTION OF THE PREFERRED EMBODIMENT

Figure 1:
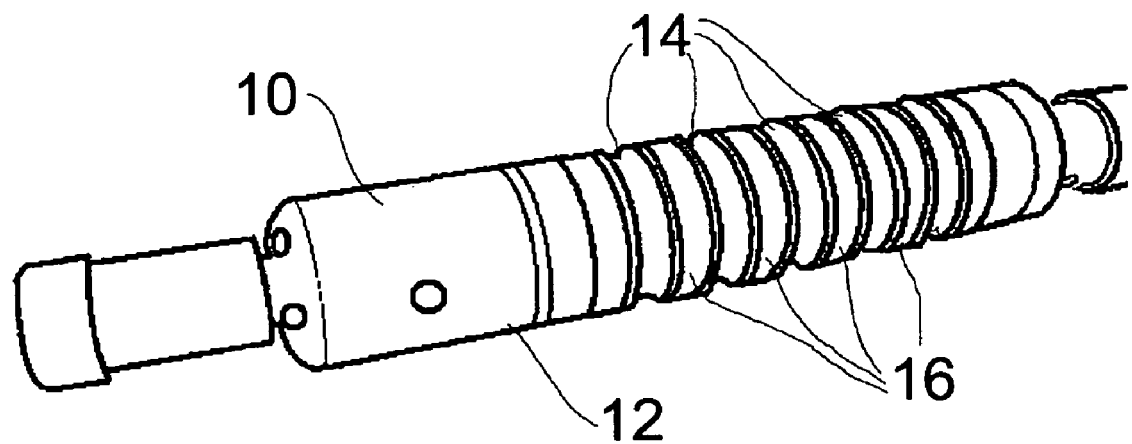
FIG. 1 is a plunger constructed in accordance with the teachings of the present invention.

The preferred embodiment, a plunger generally identified by reference numeral 10, will now be described with reference to FIG. 1.

Plunger 10 has a cylindrical body 12. Body 12 is machined in one piece with numerous circumferential exterior seal grooves 14. Replaceable annular seals 16 made from elastomer are positioned in seal grooves 14. As depicted, annular seals 16 are positioned in every other seal groove 14. Plunger 10 has the distinct advantage of having no joints. It will be appreciated that it not essential that there be no joints. Benefits could be gained by simply reducing the number of joints. This is done by placing more than one of seal grooves 14 on each portion of more than one portion of body 12.

It would not be possible to make plunger 10, unless some method were developed for installing annular seals 16 onto a one piece body 12.

Figure 2:
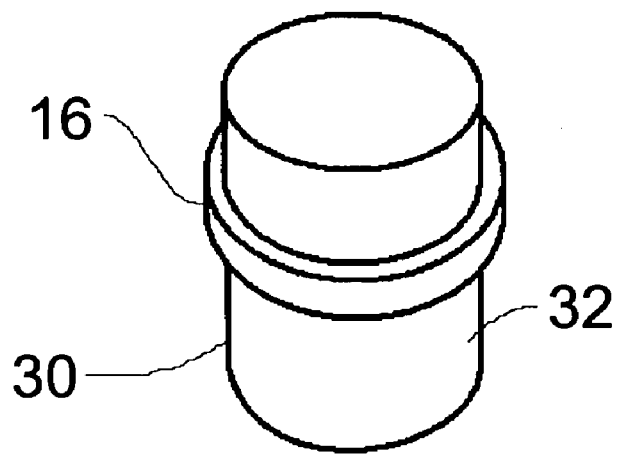
FIG. 2 is a perspective view of an elastomer seal being expanded by a truncated conical seal expanding member.
Figure 3:
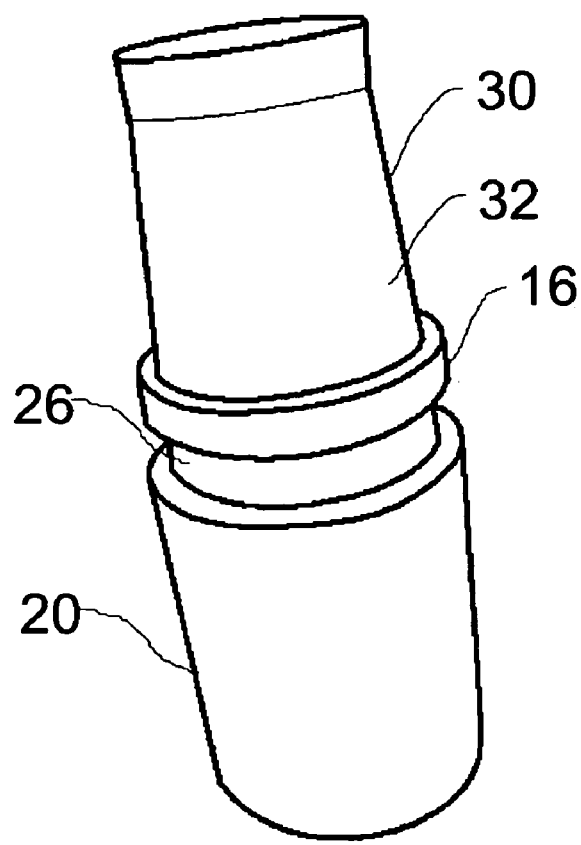
FIG. 3 is a side elevation view of the elastomer seal being transferred from the seal expanding member onto a seal installation tool.
Figure 4:
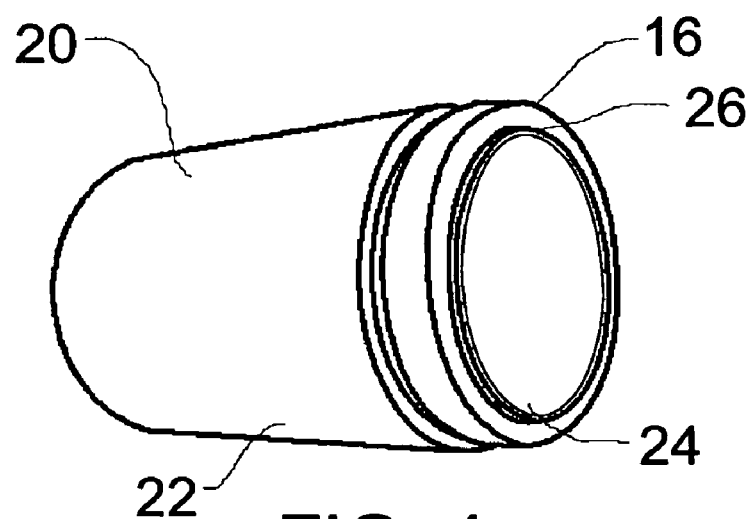
FIG. 4 is a perspective view of the elastomer seal mounted on the seal installation tool.
Figure 5:
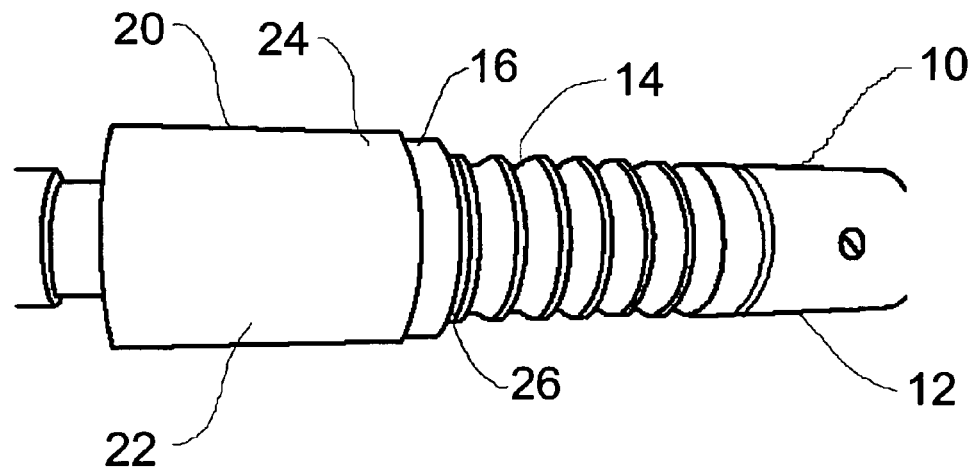
FIG. 5 is a side elevation view of the seal installation tool overlying a plunger body.
Figure 6:
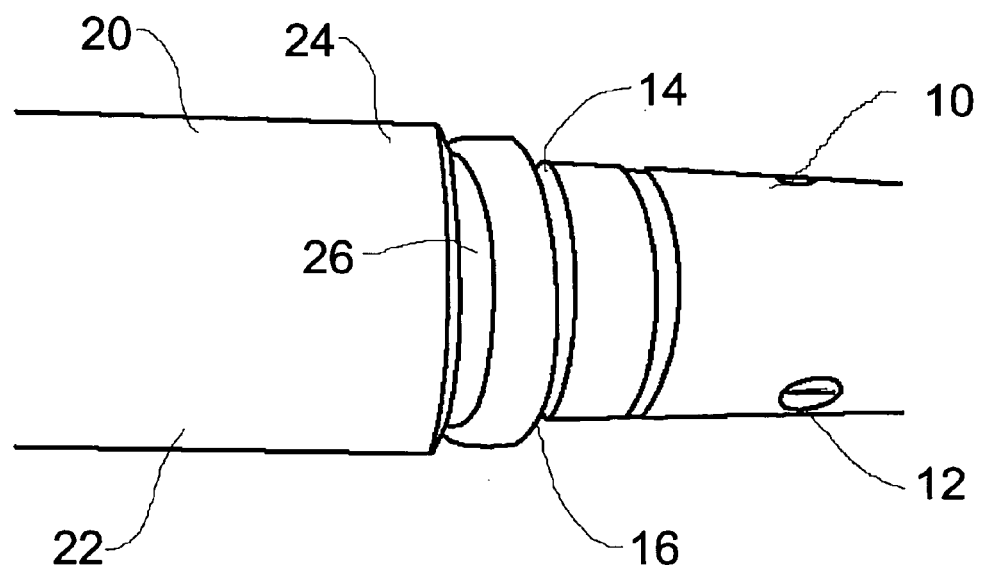
FIG. 6 is a side elevation view of the elastomer seal being transferred from the seal installation tool onto the plunger body.

Referring to FIG. 2 through 6, there will now be described a preferred method of installing annular seals 16. Referring to FIG. 4, annular seal 16 is positioned on a seal installation tool 20. Seal installation tool 20 is adapted to hold annular seal 16 in an expanded state. Seal installation tool 20 can take a number of forms. The form selected for illustration is a sleeve-form body 22 with an exterior surface 24 on which is positioned a seal seat 26. Referring to FIG. 5, body 22 is positioned so that annular seal 16 overlies body 12 of plunger 10. Referring to FIG. 6, annular seal 16 is then transferred from seal installation tool 20 to one of seal grooves 14 on body 12 of plunger 10.

It will be appreciated that body 22 of seal installation tool 20 need not be in the form of a sleeve. It will also be appreciated that body 22 need not overlie plunger 10, as long as annular seal 16 does. It will also be appreciated that seal seat 26 can be discontinuous, as annular seal 16 could be just as effectively held in an expanded condition by a plurality of fingers arranged in a ring.

Referring to FIG. 2, a seal expanding member 30 has been developed for use in expanding annular seal 16. Seal expanding member 30 has a truncated conical body 32. It will be appreciated that body 32 need not be truncated, but only the lower portion of body 32 is needed to perform the expanding operation. An upper portion of body 32, does not serve a useful function if its outer diameter is smaller than the inner diameter of annular seal 16. It will be appreciated that the conical form is merely a convenient form of inclined plane shape to accomplish the desired objective. Other forms of inclined plane could be used to expand annular seal 16 onto seal seat 26. Referring to FIG. 3, once annular seal 16 is expanded it is transferred from seal expanding member 30 to seal seat 26 of seal installation tool 20 in preparation for installation, as described above.

In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be one and only one of the elements.

It will be apparent to one skilled in the art that modifications may be made to the illustrated embodiment without departing from the spirit and scope of the invention as hereinafter defined in the Claims.

What is claimed is:

1. In combination, a plunger and seal installation tool, the plunger comprising:
    a cylindrical body, at least a portion of the body being in one piece with more than one circumferential exterior seal groove; and
    replaceable annular seals positioned in selected ones of the seal grooves;
    the seal installation tool comprising:

a first portion having a seal seat for holding the replaceable annular seal in an expanded state prior to installation, the first portion having a cavity for receiving in mating relation the cylindrical body of the plunger, such that the seal seat overlies the cylindrical body of the plunger and is selectively positioned adjacent to a selected one of the more than one circumferential exterior seal groove; and a second portion for expanding the annular seal and transferring the annular seal to the seal seat of the first portion.

2. The combination as defined in claim 1, wherein the entire body is one place.

3. The combination as defined in claim 1, wherein the first portion is a collar having an Inner diameter sufficient to move along the cylindrical body, and the second portion has an inclined plane for expanding the annular seal onto the seal seat of the first portion.

4. A method of installing annular seals on a plunger, the method comprising the steps of:

providing a seal installation tool comprising;

a first portion having a seal seat for holding a replaceable annular seal in an expanded state prior to installation and a cavity for receiving in mating relation a cylindrical body of a plunger; and a second portion for expanding the annular seal and transferring the annular seal to the seal seat of the first portion;

positioning an annular seal on the seal seat of the seal installation tool;

inserting the body of the plunger into the cavity of the first portion of the seal installation tool and positioning the annular seal so that the annular seal positioned on the seal seat overlies a selected seal groove in the body of the plunger; and transferring the annular seal from the seal installation tool to the selected seal groove in the body of the plunger.

5. The method as defined in claim 4, the seal installation tool having a body with an exterior surface on which is positioned a seal seat; an inclined plane being used to expand the annular seal onto the seal seat.

6. The method as defined in claim 5, the inclined plane being a generally conical seal expanding member.

* * * * *